US011234548B1

(12) United States Patent
Franklin et al.

(10) Patent No.: US 11,234,548 B1
(45) Date of Patent: Feb. 1, 2022

(54) INTERCHANGEABLE SEASONAL HOLIDAY DECORATIVE METHOD AND DEVICES

(71) Applicants: Ray Franklin, Jacksonville, NC (US); James Roy Flint, Laneville, TX (US)

(72) Inventors: Ray Franklin, Jacksonville, NC (US); James Roy Flint, Laneville, TX (US)

(*) Notice: Subject to any disclaimer, the term of this patent is extended or adjusted under 35 U.S.C. 154(b) by 0 days.

(21) Appl. No.: 17/222,959

(22) Filed: Apr. 5, 2021

(51) Int. Cl.
*G06Q 30/02* (2012.01)
*A47G 33/06* (2006.01)
*G09F 15/00* (2006.01)
*G09F 19/00* (2006.01)
*A47G 33/12* (2006.01)
*H04W 4/30* (2018.01)
*H04W 4/80* (2018.01)
*G06F 15/00* (2006.01)

(52) U.S. Cl.
CPC .......... *A47G 33/06* (2013.01); *A47G 33/126* (2013.01); *G06Q 30/0236* (2013.01); *G06Q 30/0281* (2013.01); *H04W 4/30* (2018.02); *G06F 15/00* (2013.01); *H04W 4/80* (2018.02)

(58) Field of Classification Search
CPC ..................................................... G06Q 30/02
See application file for complete search history.

(56) References Cited

U.S. PATENT DOCUMENTS

| | | | | |
|---|---|---|---|---|
| 6,247,991 B1* | 6/2001 | Chen | ..................... | G09F 19/02 446/242 |
| 2013/0059534 A1* | 3/2013 | Sobalvarro | ............ | G06Q 30/02 455/41.1 |
| 2014/0287779 A1* | 9/2014 | O'Keefe | ............... | H04W 4/024 455/456.3 |
| 2015/0010719 A1* | 1/2015 | Kuzman | ............ | A47G 23/0306 428/7 |
| 2016/0162913 A1* | 6/2016 | Linden | ............... | G06Q 30/0202 705/7.31 |
| 2018/0322817 A1* | 11/2018 | Gibson | ............... | G09F 15/0075 |

* cited by examiner

*Primary Examiner* — Vincent M Cao
(74) *Attorney, Agent, or Firm* — Edmond DeFrank

(57) ABSTRACT

The embodiments disclose an apparatus including an interchangeable seasonal holiday decorative device configured for displaying a dynamic rotating seasonal image theme pattern, a motorized base configured for extending, rotating and retracting the interchangeable seasonal holiday decorative device inserted into the motorized base, a counter rotating device coupled to at least one cartridge pole link of the interchangeable seasonal holiday decorative device configured for rotating extended thin metal rods with collapsible patterns in an opposite direction of that of a rotating collapsible center pole, an interchangeable seasonal holiday decorative device QR code display for allowing a shopper to download a seasonal decoration app for receiving interchangeable seasonal holiday decorative device sales and specials, and a near-field transmitter coupled to the interchangeable seasonal holiday decorative device QR code display for transmitting automatically shopper seasonal decoration time spent, date, time of day, retailer store ID marketing data.

20 Claims, 20 Drawing Sheets

INTERCHANGEABLE SEASONAL HOLIDAY DECORATIVE METHOD AND DEVICES

BACKGROUND

Decorating a home and business for the seasonal changes and holidays is very common. People however spend a lot of their time replacing home décor items as the seasons change. A significant amount of storage space is needed for storage of the numerous and continuous observation/celebration towards the seasons and holidays a person enjoys. Another aspect is the amount of money spent on perishable décor items for various holidays.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of an interchangeable seasonal holiday decorative method and devices is described for illustrative purposes and the underlying system can apply to any number and multiple types of decorations. In one embodiment of the present invention, the interchangeable seasonal holiday decorative method and devices can be configured using lighted thin metal rods. The interchangeable seasonal holiday decorative method and devices can be configured to include counter rotating elements and can be configured to include remote operating controls using the present invention.

Figure 1:
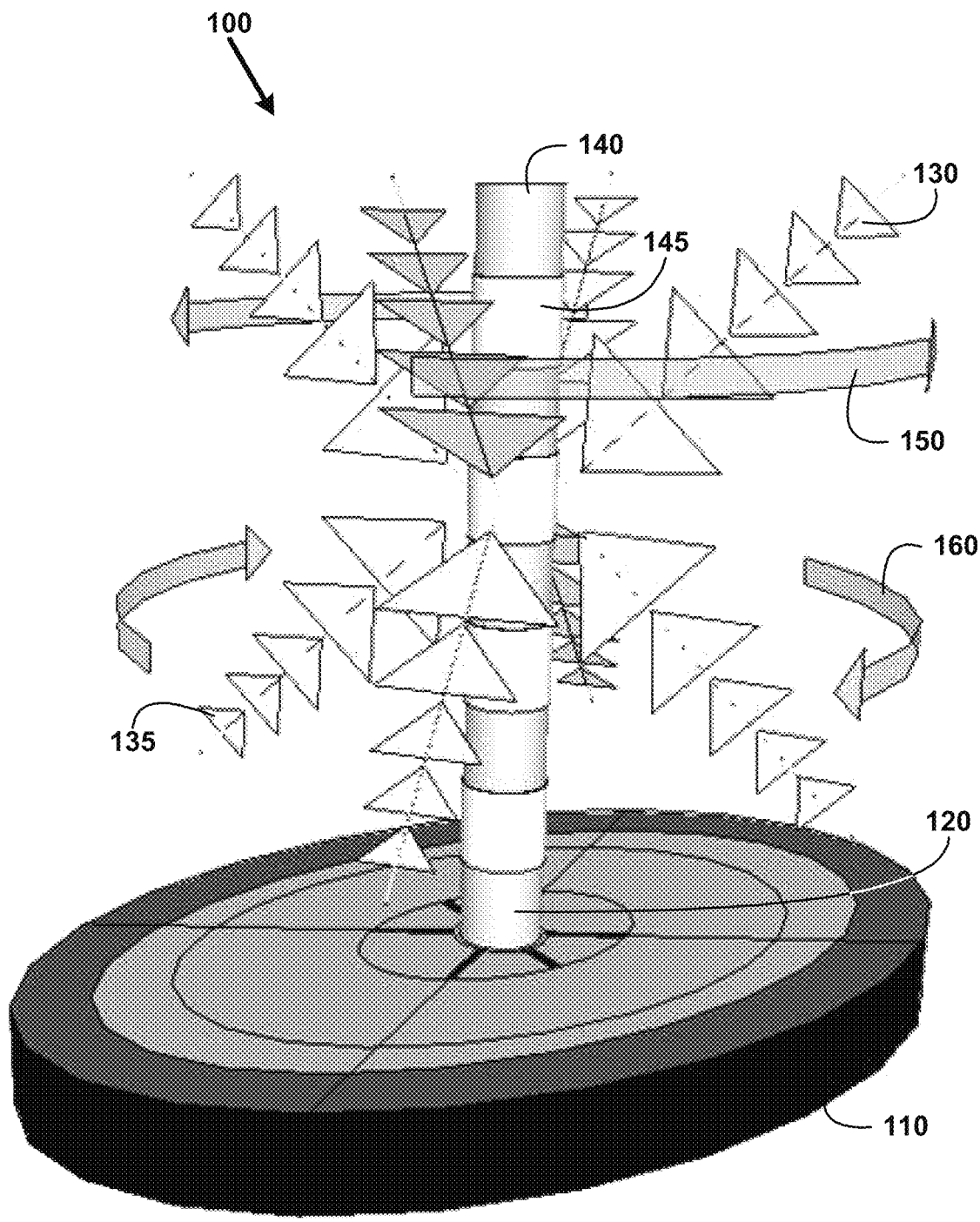
FIG. 1 shows for illustrative purposes only an example of an overview of an interchangeable seasonal holiday decorative device of one embodiment.

FIG. 1 shows for illustrative purposes only an example of an overview of an interchangeable seasonal holiday decorative device of one embodiment. FIG. 1 shows an interchangeable seasonal holiday decorative device 100 with a motorized base 110. The interchangeable seasonal holiday decorative device 100 includes a plurality of interchangeable multi-colored led light cartridges 120. The interchangeable seasonal holiday decorative device 100 is a framework for a specific seasonal or holiday decoration 130 with branches and extensions that create the dynamic presentation of the decoration 135. A plurality of a notch link 140 forms a portion of the interlocking segment link 145 framework. The motorized base 110 rotates the inserted interlocking segment link 145 framework in a motorized base rotation direction 150 and in an opposite seasonal or holiday decoration rotation direction 160 of one embodiment.

Figure 2A:
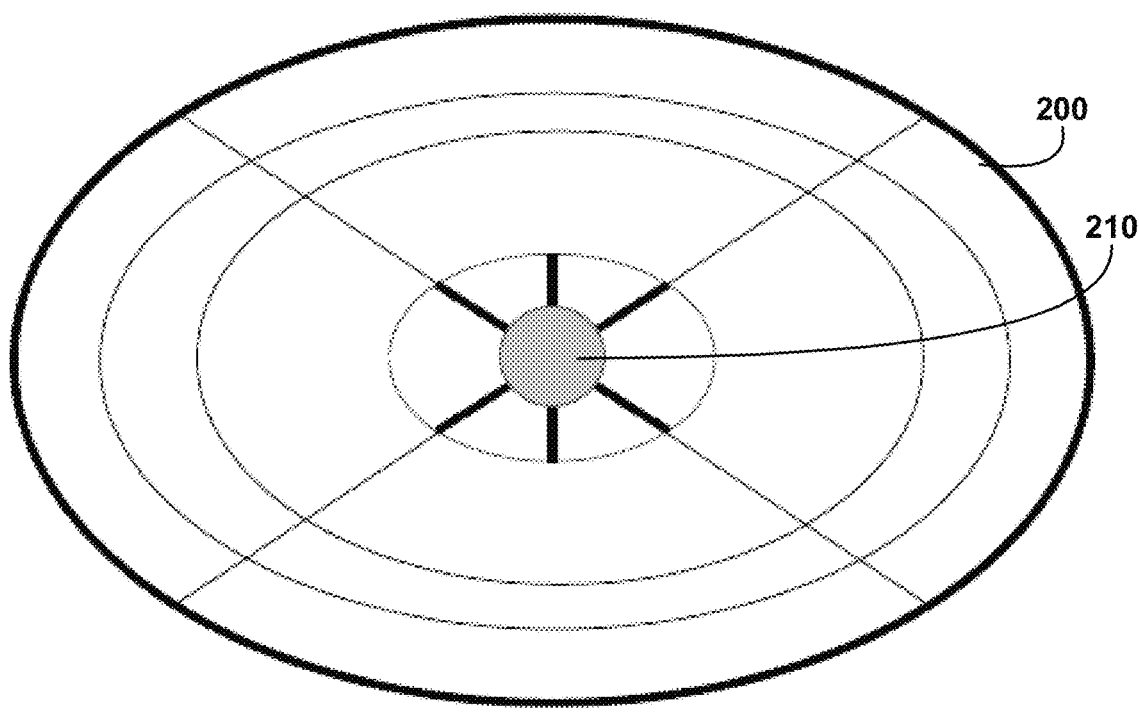
FIG. 2A shows for illustrative purposes only an example of a decorative device base top view of one embodiment.

Detailed Description:

FIG. 2A shows for illustrative purposes only an example of a decorative device base top view of one embodiment. FIG. 2A shows a motorized base top view 200 motorized base insert slot 210. The motorized base insert slot 210 is the receptacle for inserting the interlocking segment link 145 of FIG. 1 framework of one embodiment.

Figure 2B:
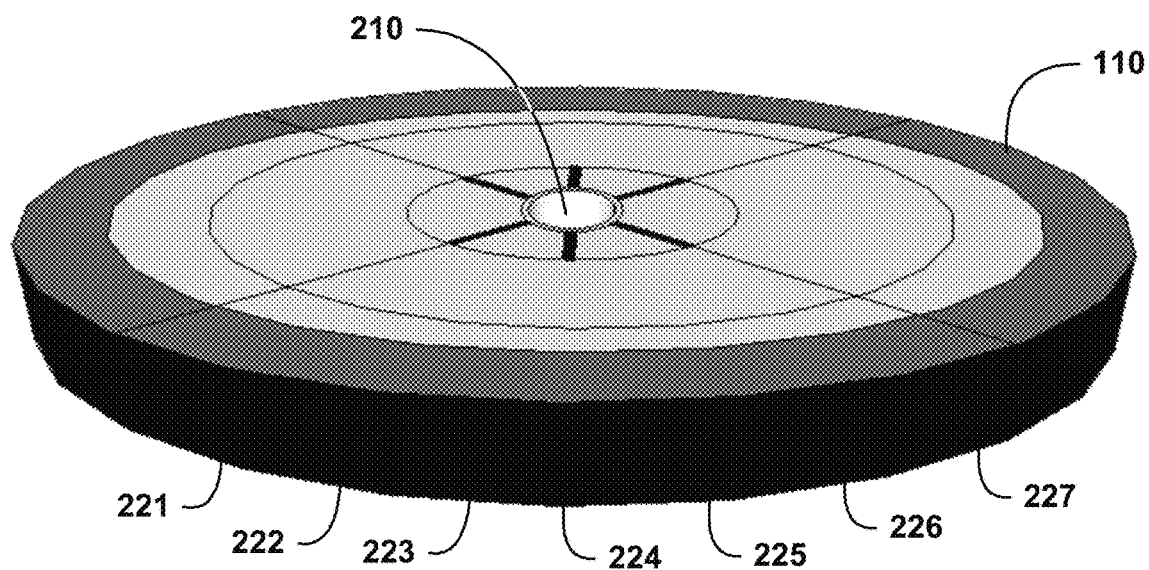
FIG. 2B shows for illustrative purposes only an example of a decorative device base perspective view of one embodiment.

A Decorative Device Base Perspective View:

FIG. 2B shows for illustrative purposes only an example of a decorative device base perspective view of one embodiment. FIG. 2B shows the motorized base insert slot 210 of the motorized base 110. The motorized base 110 consists of at least one rechargeable battery 221, WIFI communication device 222, cellular communication device 223, motor 224, operational controls 225, a speaker 226 and a digital memory device 227 of one embodiment.

Figure 2C:
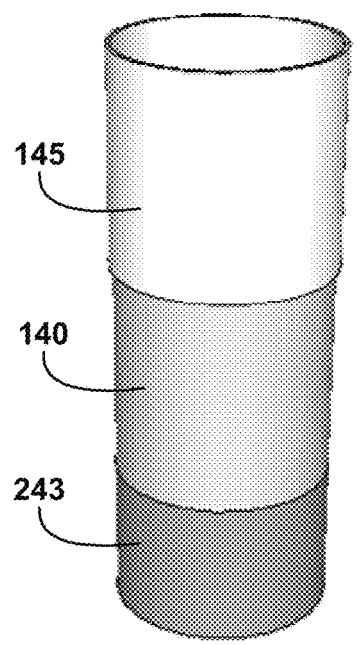
FIG. 2C shows for illustrative purposes only an example of pole link segments of one embodiment.

Pole Link Segments:

FIG. 2C shows for illustrative purposes only an example of pole link segments of one embodiment. FIG. 2C shows an interlocking segment link 145, a notch link 140 and a cartridge motorized base pole link insert 243 joined in the interlocked configurations wherein the individual segments are coupled and extended to length of one embodiment.

Figure 2D:
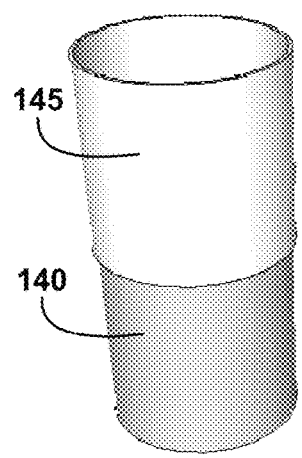
FIG. 2D shows for illustrative purposes only an example of pole link segments extended of one embodiment.

Pole Link Segments Extended:

FIG. 2D shows for illustrative purposes only an example of pole link segments extended of one embodiment. FIG. 2D shows the interlocking segment link 145 and notch link 140 in an extended pairing of one embodiment.

Figure 2E:
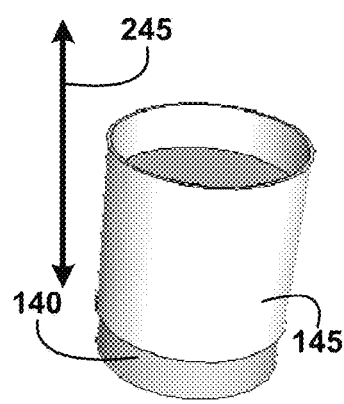
FIG. 2E shows for illustrative purposes only an example of pole links compressed of one embodiment.

Pole Links Compressed:

FIG. 2E shows for illustrative purposes only an example of pole links compressed of one embodiment. FIG. 2E shows the interlocking segment link 145 and notch link 140 in a collapsed pairing. The segmented pole links slide to envelope the adjoining segment of one embodiment.

Figure 2F:
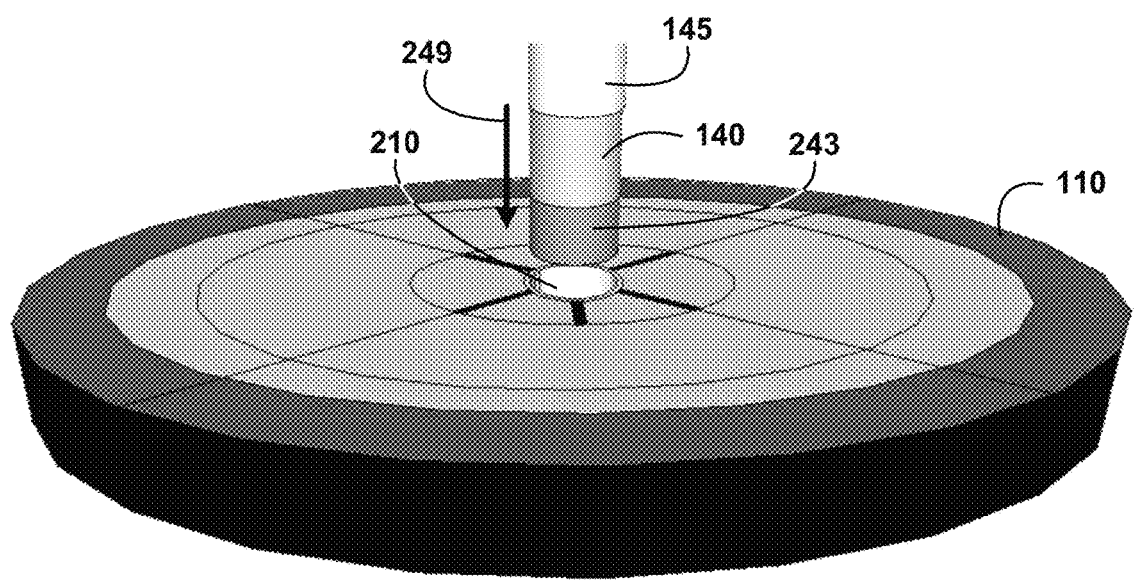
FIG. 2F shows for illustrative purposes only an example of a cartridge segment being inserted into the base of one embodiment.

A Cartridge Segment being Inserted into the Base:

FIG. 2F shows for illustrative purposes only an example of a cartridge segment being inserted into the base of one embodiment. FIG. 2F shows the motorized base 110, interlocking segment link 145, notch link 140 and motorized base insert slot 210. The cartridge motorized base pole link insert 243 is coupled to the bottom of the interlocking segment link 145 framework. Inserting the cartridge motorized base pole link insert into the motorized base insert slot 249 allows the rotation of the motorized base 110 to cause the extension of the interlocking segment link 145 framework and deployment of the branches and extensions that create the dynamic presentation of the decoration 135 of FIG. 1 of one embodiment.

Figure 2G:
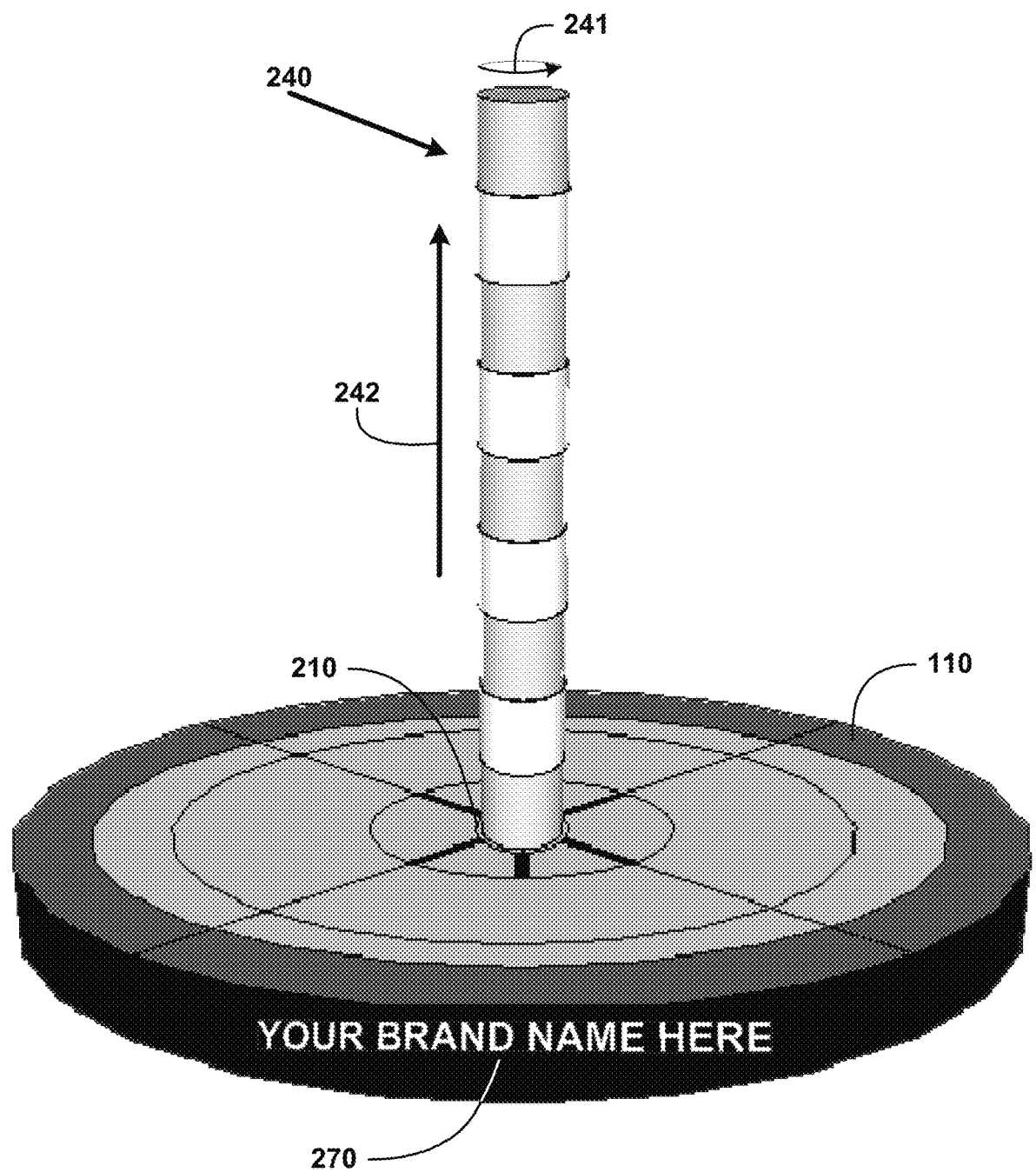
FIG. 2G shows for illustrative purposes only an example of pole links extended to form a collapsible center pole of one embodiment.

Pole Links Extended to Form a Collapsible Center Pole:

FIG. 2G shows for illustrative purposes only an example of pole links extended to form a collapsible center pole of one embodiment. FIG. 2G shows an extended collapsible center pole 240 comprised of the segmented link sections after being extended by the motorized rotation 241. A rotating extension 242 imparted by the motorized base insert slot 210 of the motorized base 110 creates the force and mechanical mechanisms of the extension devices of the segmented link sections to slide the sections apart to reach full extension. A retailer or distributor may affix or imprint their brand in the location indicated by a your brand name here 270 designation on the motorized base 110 of one embodiment.

Figure 3A:
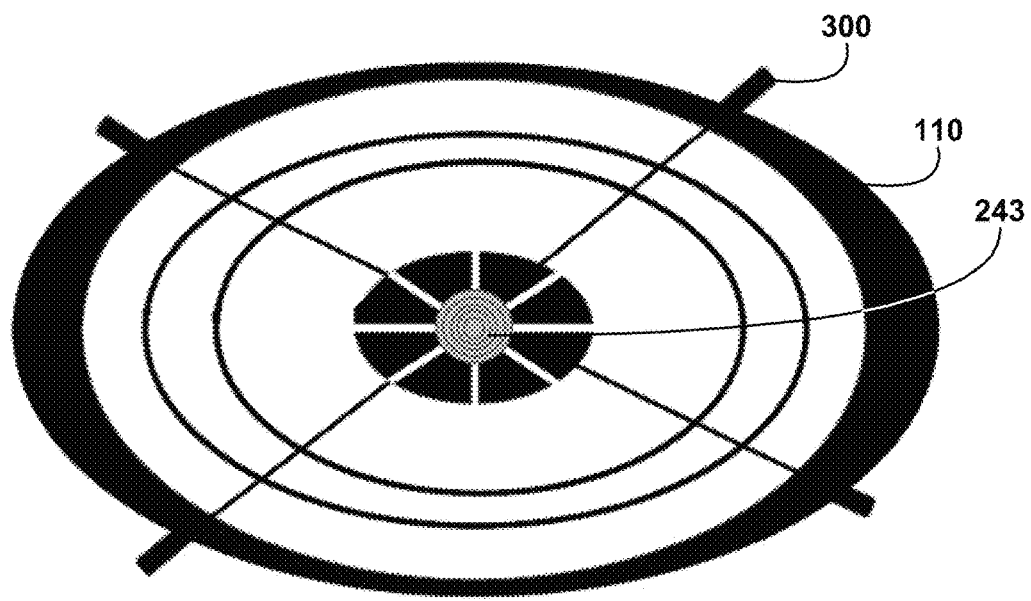
FIG. 3A shows for illustrative purposes only an example of base clips of one embodiment.

Base Clips:

FIG. 3A shows for illustrative purposes only an example of base clips of one embodiment. FIG. 3A shows base clips 300 coupled to the motorized base 110 with the cartridge motorized base pole link insert 243. The base clips 300 may be used to anchor the base motorized base 110 to an object of one embodiment.

Figures 3B, 3C:
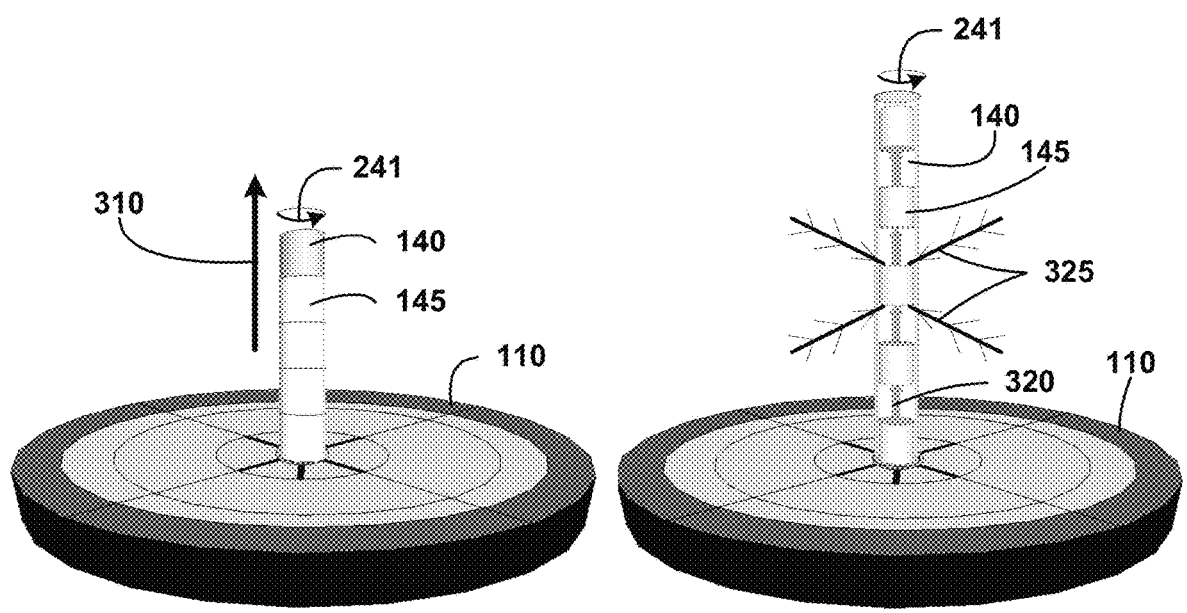
FIG. 3B shows for illustrative purposes only an example of an upward movement of the pole links of one embodiment.
FIG. 3C shows for illustrative purposes only an example of a rotating upward movement of one embodiment.

An Upward Movement of the Pole Links:

FIG. 3B shows for illustrative purposes only an example of an upward movement of the pole links of one embodiment. FIG. 3B shows motorized rotation 241 extending upward the plurality of the interlocking segment link 145 and notch link 140 sections. Motorized rotation moving the segmented pole links upward 310 from the motorized base 110 is one step in displaying the interchangeable seasonal holiday decoration of one embodiment.

A Rotating Upward Movement:

FIG. 3C shows for illustrative purposes only an example of a rotating upward movement of one embodiment. FIG. 3C shows the motorized base 110, motorized rotation 241, interlocking segment link 145 and notch link 140 sections. An upward movement of notch links 320 provides the force for thin metal rods and collapsible patterns being extended to produce a decorative image 325 of one embodiment.

Figure 3D:
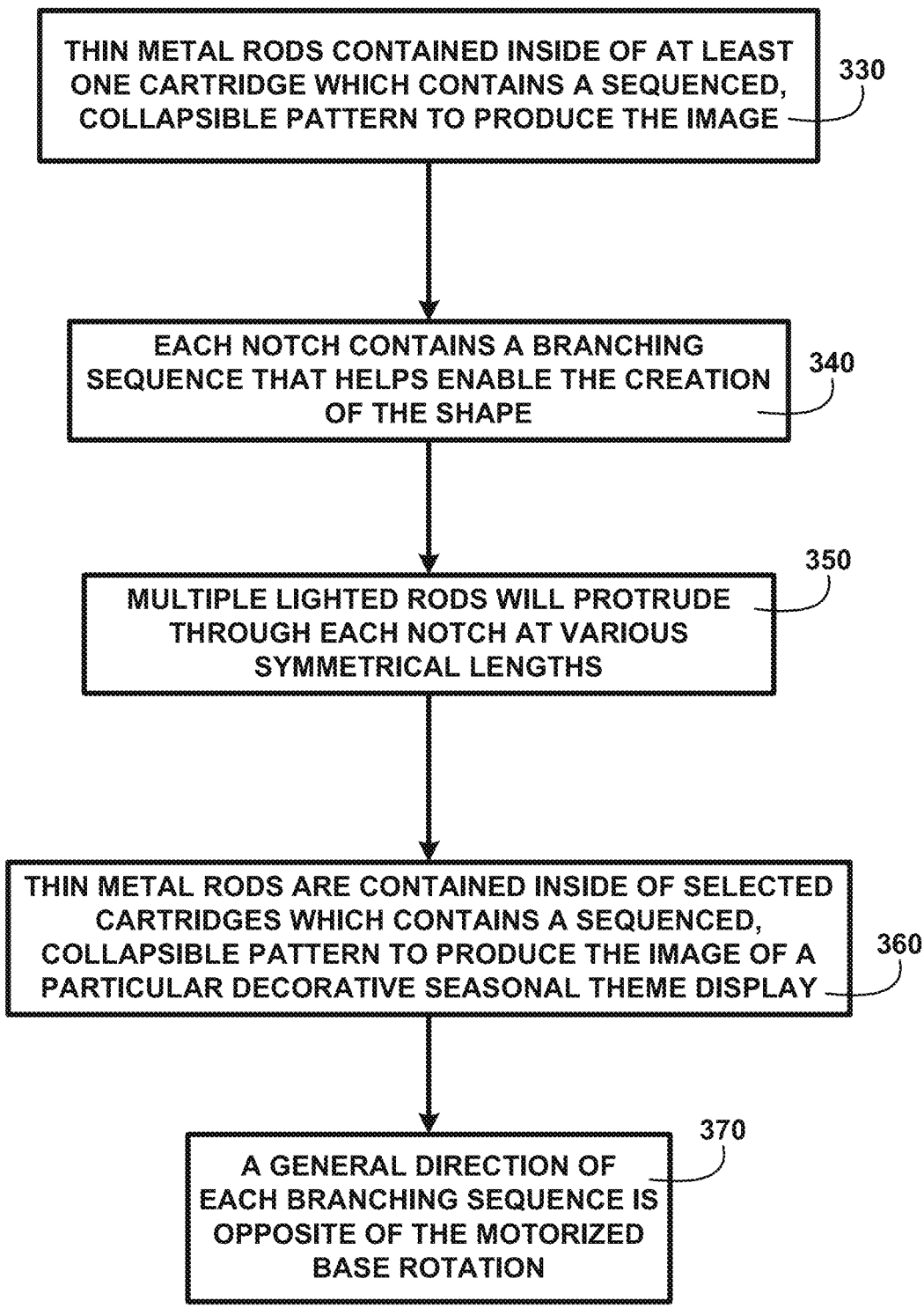
FIG. 3D shows a block diagram of an overview of thin metal rods of one embodiment.

Thin Metal Rods:

FIG. 3D shows a block diagram of an overview of thin metal rods of one embodiment. FIG. 3D shows thin metal rods contained inside of at least one cartridge which contains a sequenced, collapsible pattern to produce the image 330. Each notch contains a branching sequence that helps enable the creation of the shape 340. Multiple lighted rods will protrude through each notch at various symmetrical lengths 350. Thin metal rods are contained inside of selected cartridges which contains a sequenced, collapsible pattern to produce the image 360 of a particular decorative seasonal theme display. A general direction of each branching sequence is opposite of the motorized base rotation 370 of one embodiment.

Figure 4A:
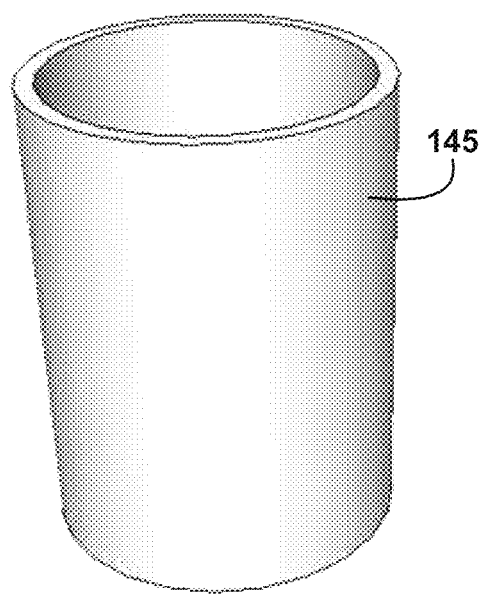
FIG. 4A shows for illustrative purposes only an example of an interlocking segment of one embodiment.

An Interlocking Segment:

FIG. 4A shows for illustrative purposes only an example of an interlocking segment of one embodiment. FIG. 4A shows the interlocking segment link 145 that slides over the notch link 140 of FIG. 1 of one embodiment.

Figure 4B:
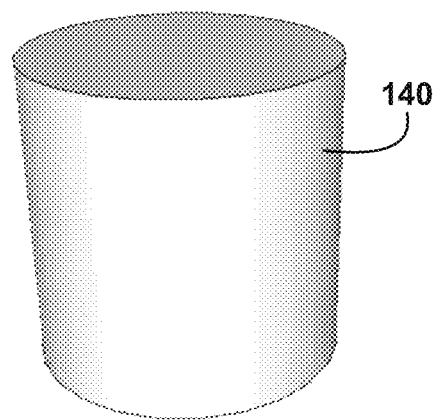
FIG. 4B shows for illustrative purposes only an example of a notch segment of one embodiment.

A Notch Segment:

FIG. 4B shows for illustrative purposes only an example of a notch segment of one embodiment. FIG. 4B shows the notch link 140 section of the extendable center pole of one embodiment.

Figure 5:
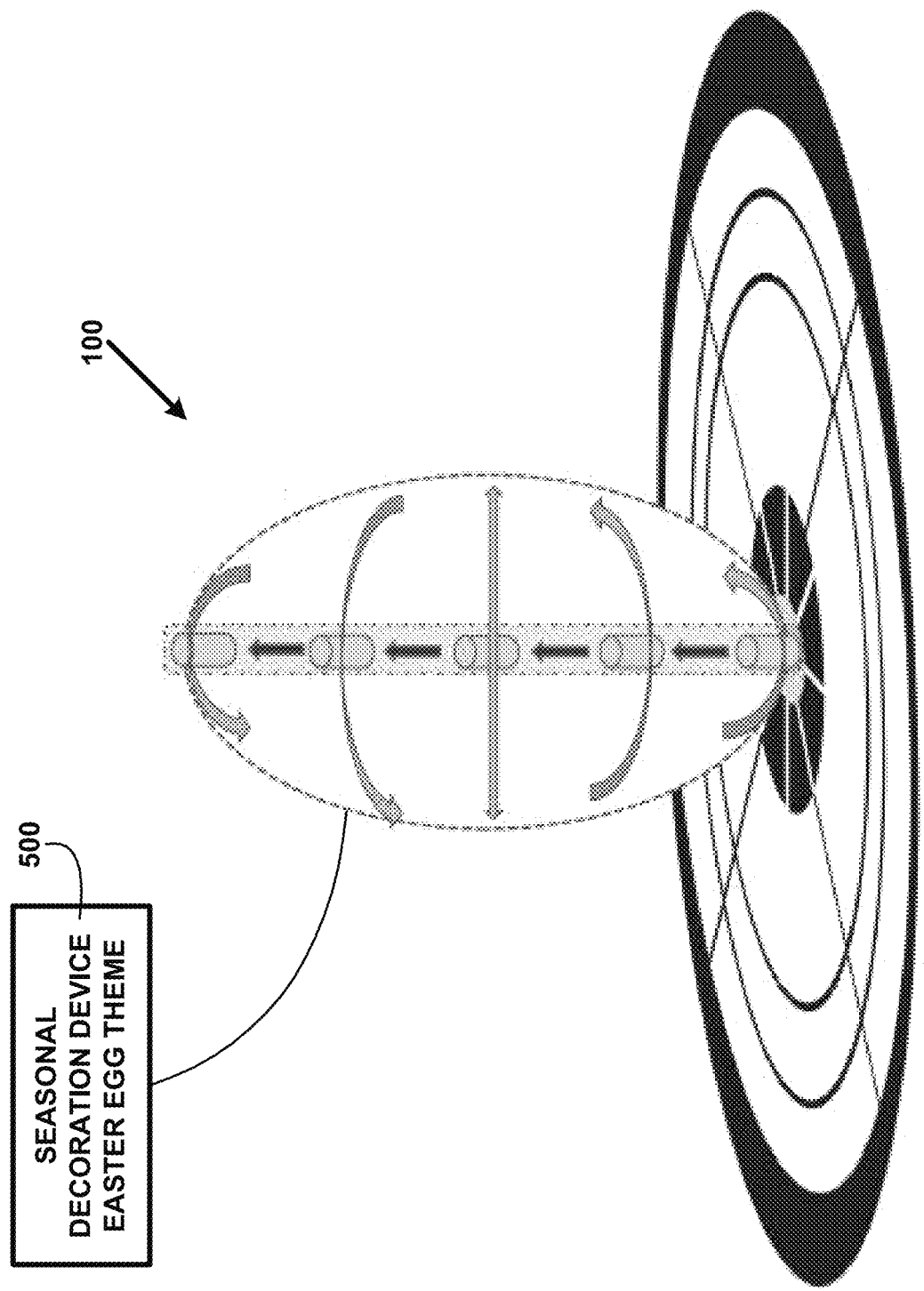
FIG. 5 shows for illustrative purposes only an example of seasonal decoration device Easter egg theme of one embodiment.

Seasonal Decoration Device Easter Egg Theme:

FIG. 5 shows for illustrative purposes only an example of seasonal decoration device Easter egg theme of one embodiment. FIG. 5 shows one embodiment of the interchangeable seasonal holiday decorative device 100. This embodiment is configured for a seasonal decoration device Easter egg theme 500 of one embodiment.

Figure 6:
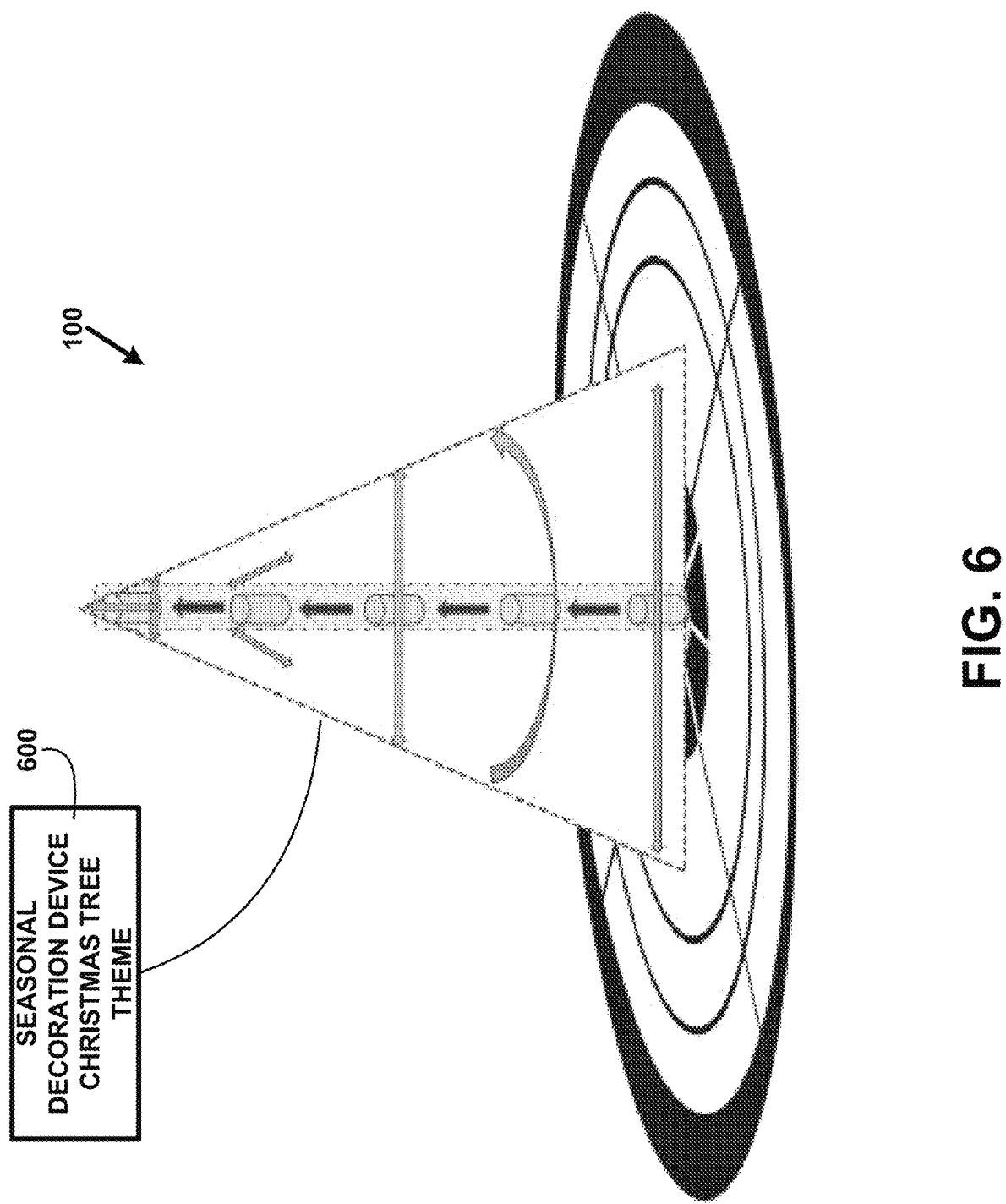
FIG. 6 shows for illustrative purposes only an example of seasonal decoration device Christmas tree theme of one embodiment.

Seasonal Decoration Device Christmas Tree Theme:

FIG. 6 shows for illustrative purposes only an example of seasonal decoration device Christmas tree theme of one embodiment. FIG. 6 shows one embodiment of the interchangeable seasonal holiday decorative device 100 configured for a seasonal decoration device Christmas tree theme 600 of one embodiment.

Figure 7:
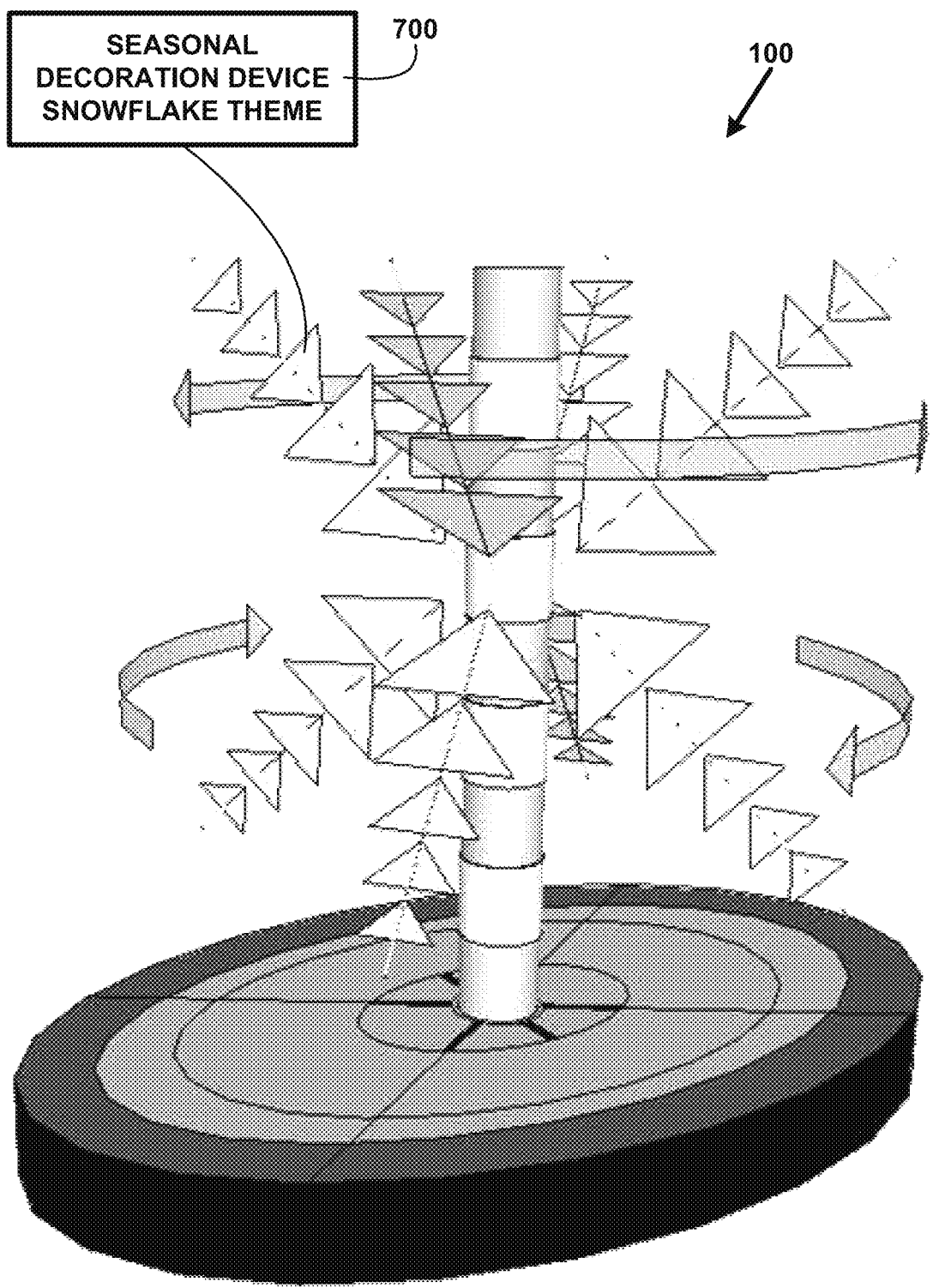
FIG. 7 shows for illustrative purposes only an example of seasonal decoration device snowflake theme of one embodiment.

Seasonal Decoration Device Snowflake Theme:

FIG. 7 shows for illustrative purposes only an example of seasonal decoration device snowflake theme of one embodiment. FIG. 7 shows one embodiment of the interchangeable seasonal holiday decorative device 100 configured for a seasonal decoration device snowflake theme 700 of one embodiment.

Figure 8A:
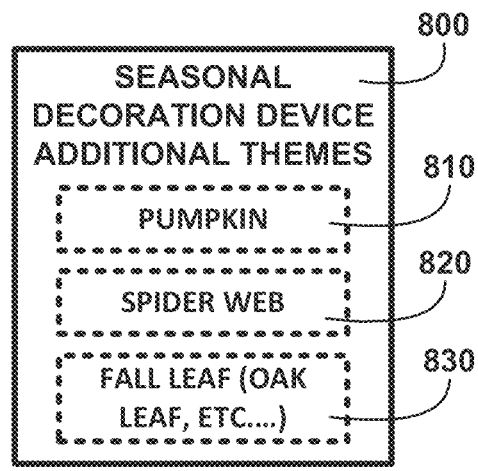
FIG. 8A shows a block diagram of an overview of seasonal decoration device additional themes of one embodiment.

Seasonal Decoration Device Additional Themes:

FIG. 8A shows a block diagram of an overview of seasonal decoration device additional themes of one embodiment. FIG. 8A shows other embodiments of seasonal decoration device additional themes 800. A few examples of the seasonal decoration device additional themes 800 configurations are of a pumpkin 810, a spider web 820 and a fall leaf (oak leaf, etc. . . . ) 830 of one embodiment.

Figure 8B:
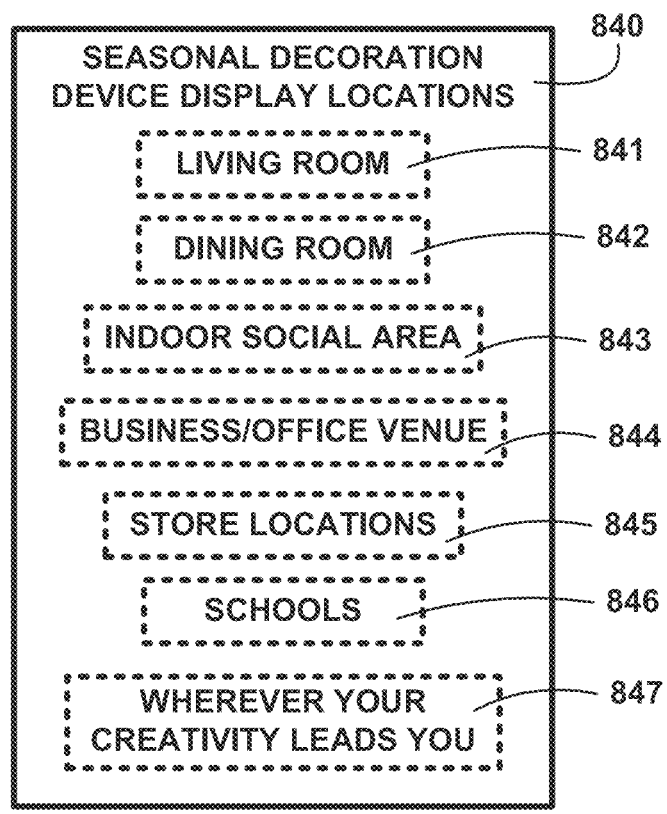
FIG. 8B shows a block diagram of an overview of seasonal decoration device display locations of one embodiment.

Seasonal Decoration Device Display Locations:

FIG. 8B shows a block diagram of an overview of seasonal decoration device display locations of one embodiment. FIG. 8B shows seasonal decoration device display locations 840 where the interchangeable seasonal holiday decorative device 100 of FIG. 1 may be displayed by a user including a living room 841, dining room 842, indoor social area 843, business/office venue 844, store locations 845, schools 846 and wherever your creativity leads you 847 of one embodiment.

Figure 9:
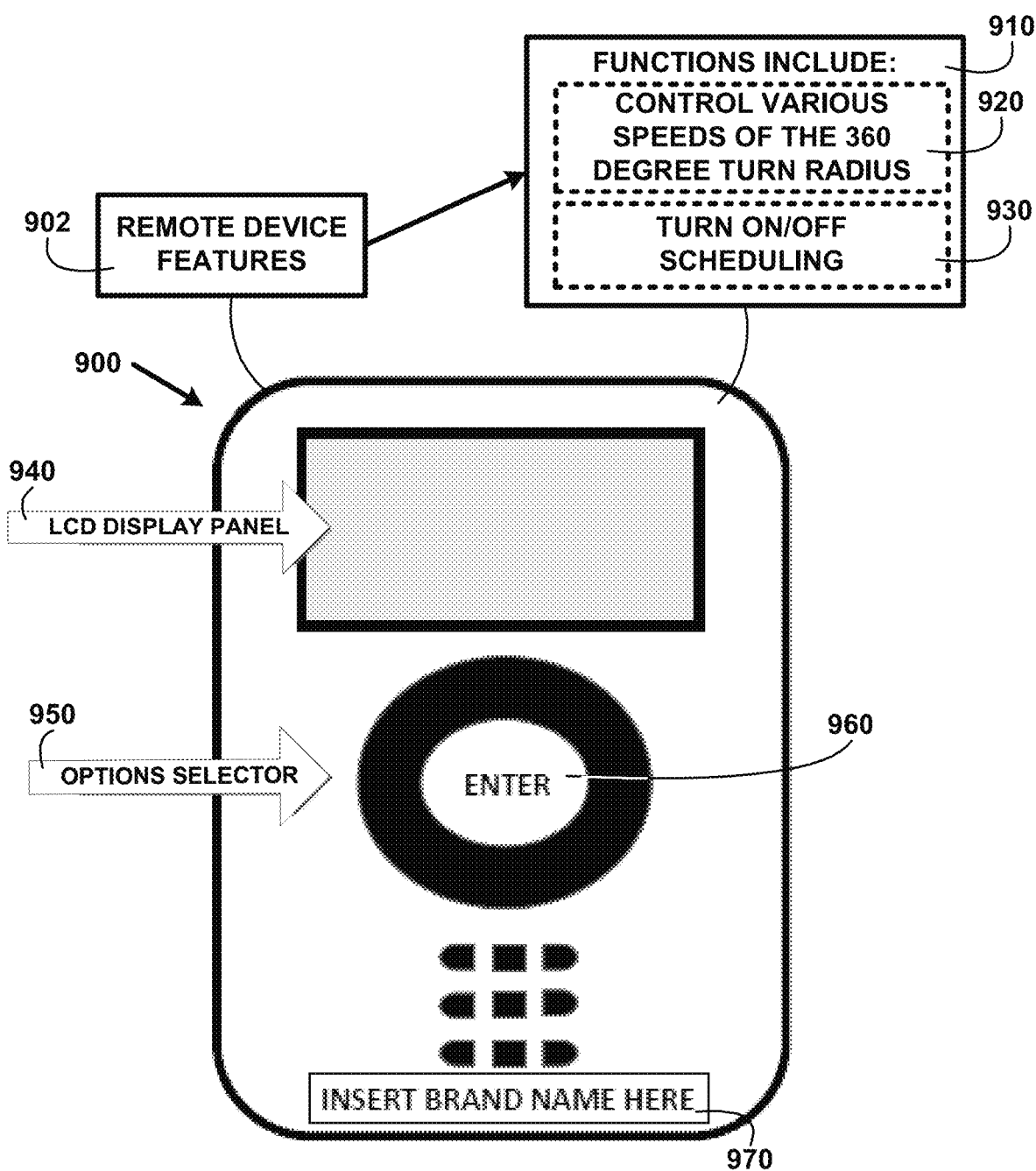
FIG. 9 shows for illustrative purposes only an example of an overview of interchangeable seasonal holiday decorative device remote control of one embodiment.

Interchangeable Seasonal Holiday Decorative Device Remote Control:

FIG. 9 shows for illustrative purposes only an example of an overview of interchangeable seasonal holiday decorative device remote control of one embodiment. FIG. 9 shows interchangeable seasonal holiday decorative device remote control 900. The interchangeable seasonal holiday decorative device remote control 900 allows a user to remotely operate the device from a distance. The interchangeable seasonal holiday decorative device remote control 900 includes remote device features 902. The remote device features 902 provide operational functions. The functions include: 910 control various speeds of the 360 degree turn radius 920, turn on/off scheduling 930, a LCD display panel 940, options selector 950, enter selection button 960. The interchangeable seasonal holiday decorative device remote control 900 also provides a space for a retailer or distributor to insert brand name here 970 of one embodiment.

Figure 10:
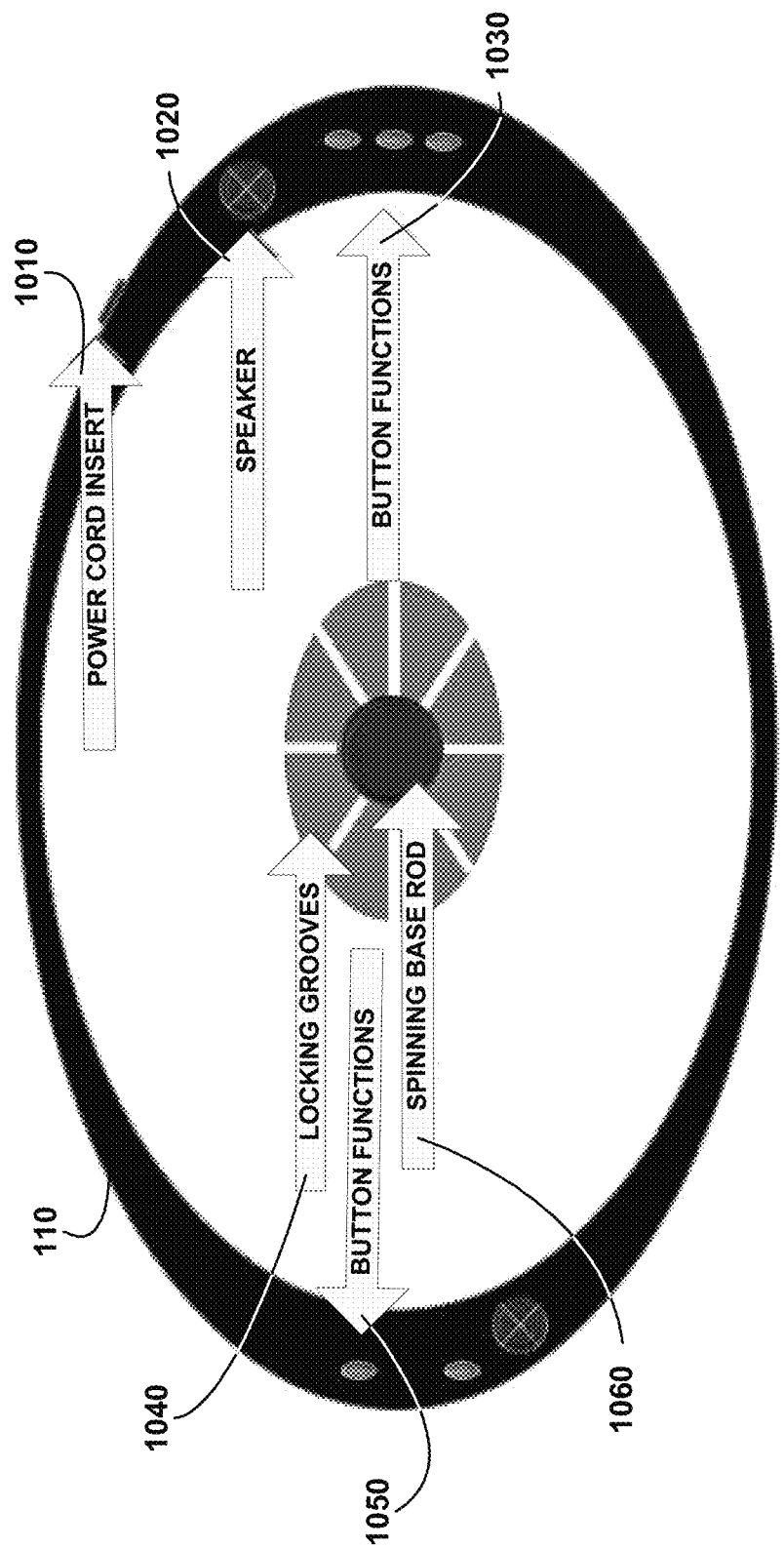
FIG. 10 shows for illustrative purposes only an example of an overview of base features of one embodiment.

Base Features:

FIG. 10 shows for illustrative purposes only an example of an overview of base features of one embodiment. FIG. 10 shows the motorized base 110 features including a power cord insert 1010 to both power the device and recharge the at least one rechargeable battery 221. The motorized base 110 features include at least one speaker 1020 to play seasonal music recorded on the digital memory device 227. The motorized base 110 features further include button functions 1030 at one terminus and other button functions 1050 at the opposite terminus with each group of button functions performing different functions. Locking grooves 1040 provide a space for cables used by the base clips 300 to secure the device. Also showing is a spinning base rod 1060 that will rotate using the motor of the motorized base 110 of one embodiment.

Figure 11:
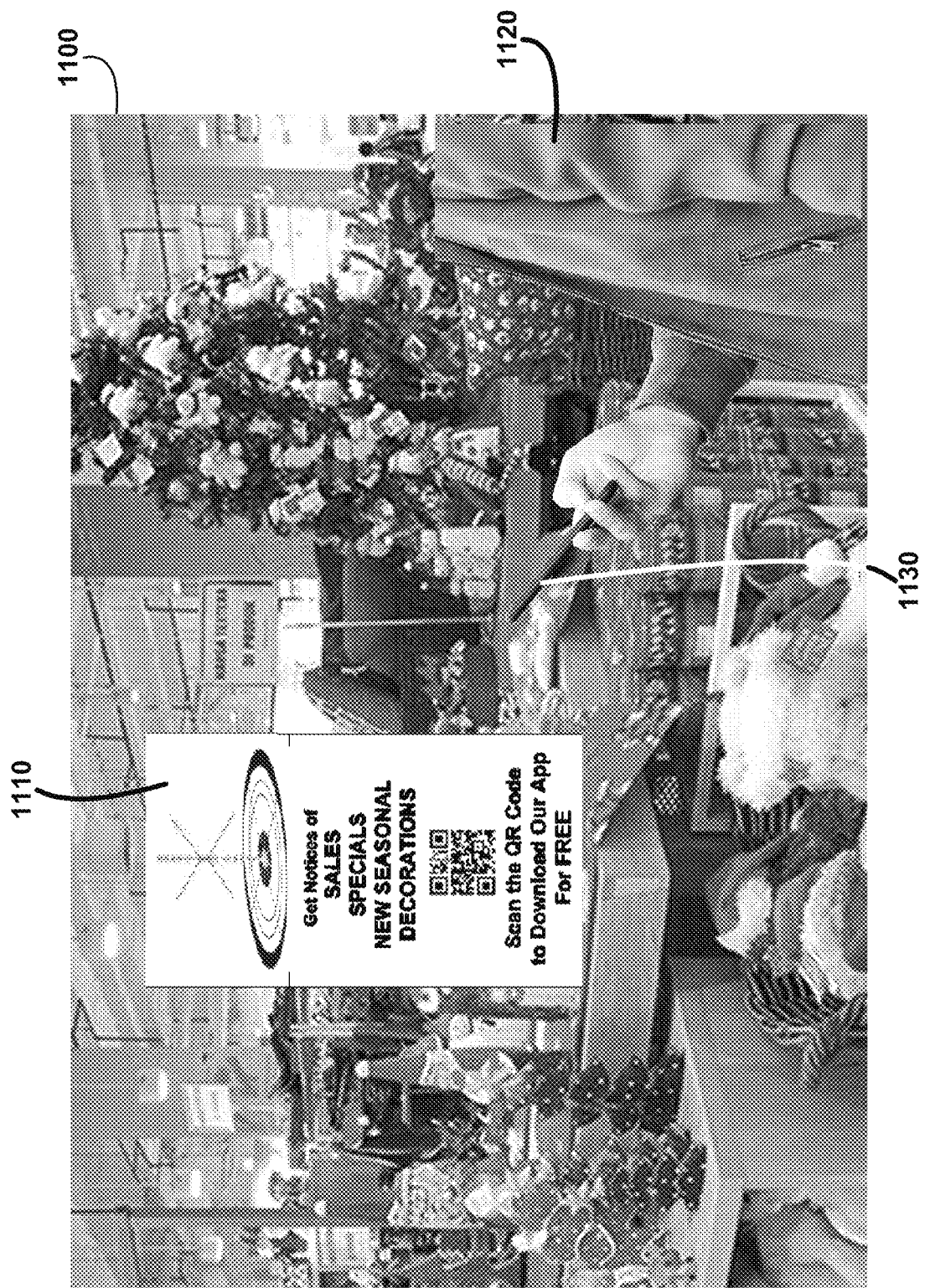
FIG. 11 shows for illustrative purposes only an example of an overview of store display of one embodiment.

Store Display:

FIG. 11 shows for illustrative purposes only an example of an overview of store display of one embodiment. FIG. 11 shows a retail store 1100 where is erected an interchangeable seasonal holiday decorative device QR code display 1110. In the retail store 100 is a shopper with a cell phone 1120. A shopper cell phone with a camera 1130 can take a picture of the interchangeable seasonal holiday decorative device QR code display 1110 QR code to down load a seasonal decoration app of one embodiment.

Figure 12A:
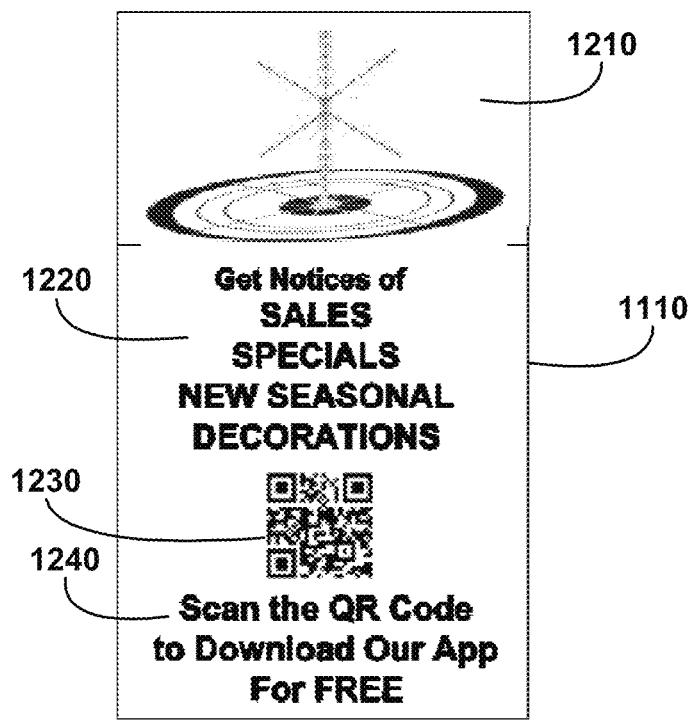
FIG. 12A shows for illustrative purposes only an example of an overview of store display QR code of one embodiment.

Store Display QR Code:

FIG. 12A shows for illustrative purposes only an example of an overview of store display QR code of one embodiment. FIG. 12A shows the interchangeable seasonal holiday decorative device QR code display 1110. The interchangeable seasonal holiday decorative device QR code display 1110 shows at least one interchangeable seasonal holiday decorative device image 1210. The decorative device image can be changed on the display for the appropriate seasonal decorative device. The interchangeable seasonal holiday decorative device QR code display 1110 shows a message to shopper that they can get notices of sales specials new seasonal decorations 1220. It also shows a QR code 1230 with instructions to shoppers to scan the QR code to download our app for free 1240 of one embodiment.

Figure 12B:
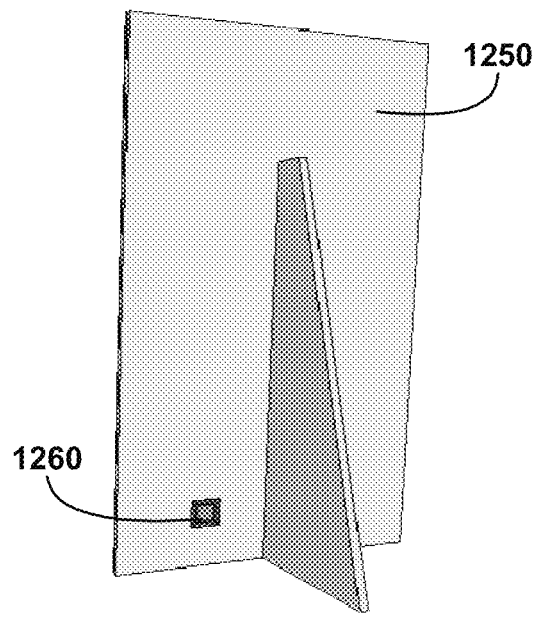
FIG. 12B shows for illustrative purposes only an example of an overview of store display NFC of one embodiment.

Store Display NFC:

FIG. 12B shows for illustrative purposes only an example of an overview of store display NFC of one embodiment. FIG. 12B shows a back side of the interchangeable seasonal holiday decorative device QR code display 1250. The back side view shows a near-field communication (NFC) NFC transmitter 1260. The NFC transmitter 1260 transmits to the shopper cell phone the global positioning satellite (GPS) GPS location, store name and seasonal holiday decorative device image ID. This information will be transmitted from the shopper cell phone to a seasonal decoration network platform should the take a picture of the QR code and automatically downloads the seasonal decoration app of one embodiment.

Figure 13:
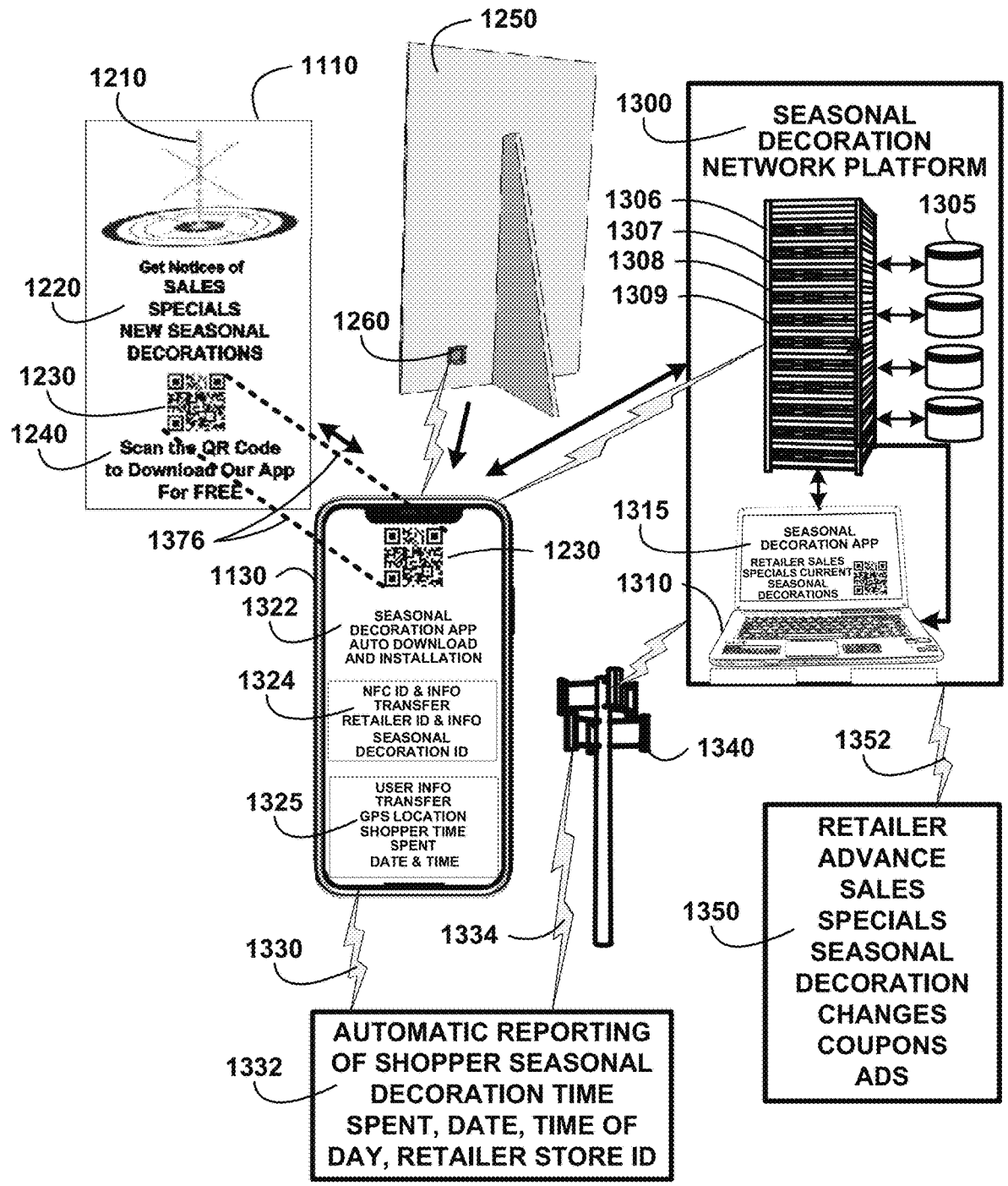
FIG. 13 shows for illustrative purposes only an example of seasonal decoration app of one embodiment.

Seasonal Decoration App:

FIG. 13 shows for illustrative purposes only an example of seasonal decoration app of one embodiment. FIG. 13 shows a seasonal decoration network platform 1300. The seasonal decoration network platform 1300 is electronically coupled to a plurality of databases 1305, a plurality of digital processors 1306, at least one WIFI communication device 1307, at least one cellular communication device 1308, at least one OCR device 1309, and a network computer 1310 with the seasonal decoration app 1315 installed. The shopper cell phone with a camera 1130 sees the interchangeable seasonal holiday decorative device QR code display 1110 and the shopper scans the QR code 1376. Upon receipt of the scanned QR code 1230 the shopper cell phone transmits data collected to the seasonal decoration network platform 1330. The data transmitted to the shopper cell phone by the NFC transmitter 1260 is relayed automatically for reporting of shopper seasonal decoration time spent, date, time of day, retailer store ID 1332. The transmission is conveyed via a cellular tower 1334. The cellular tower 1340 transmission is received by the seasonal decoration network platform 1300 at least one cellular communication device 1308. The seasonal decoration network platform 1300 automatically performs a seasonal decoration app auto download and installation 1322 to the shopper cell phone using the app programmable code stored in the plurality of databases 1305 and transmits the app using the at least one cellular communication device 1308. Simultaneously the seasonal decoration network platform 1300 is receiving and recording in the plurality of databases 1305 the NFC ID & info transfer retailer ID & info seasonal decoration ID 1324 is received by the shopper cell phone 1324.

NFC ID & info transfer retailer ID & info seasonal decoration ID 1324 and user info transfer of the GPS location, shopper time spent and date & time 1325 provide valuable market data. The shopper time spent is calculated using the seasonal decoration app 1315 receipt of when the shopper cell phone ID comes within range of the interchangeable seasonal holiday decorative device QR code display 1110 NFC transmitter 1260 until the shopper cell phone ID is not in reception range of the NFC transmitter 1260. The plurality of digital processors 1306 processes the recorded shopper time spent and analyses the data to perform a classification of the shopper's presence. Short durations for example may indicate the shopper was passing by the display but did not stop. Longer periods of the shopper's proximity to the display may for example indicate various levels of interest in the interchangeable seasonal holiday decorative device and even other seasonal decorative products. Periodic reporting of shopper time spent may be arranged with the retail store as valuable marketing data.

Upon receipt of the shopper information the retailer prepares a retailer advance sales, specials, seasonal decoration changes, coupons and ads thru the seasonal decoration network platform 1350. The retailer transmits a retailer advance sales specials seasonal decoration changes, coupons and ads thru the seasonal decoration network platform 1352 to the shopper cell phone.

The interchangeable seasonal holiday decorative device QR code display 1110 provides a marketing vehicle to advertise at least one interchangeable seasonal holiday decorative device image 1210. The shopper will on the shopper cell phone get notices of sales specials new seasonal decorations 1220 after scanning the QR code 1230 as instructed on the display to scan the QR code to download our app for free 1240. The seasonal decoration manufacturer and retailer will get marketing data from the NFC transmitter 1260 on the back side of the interchangeable seasonal holiday decorative device QR code display 1250 of one embodiment.

Figure 14:
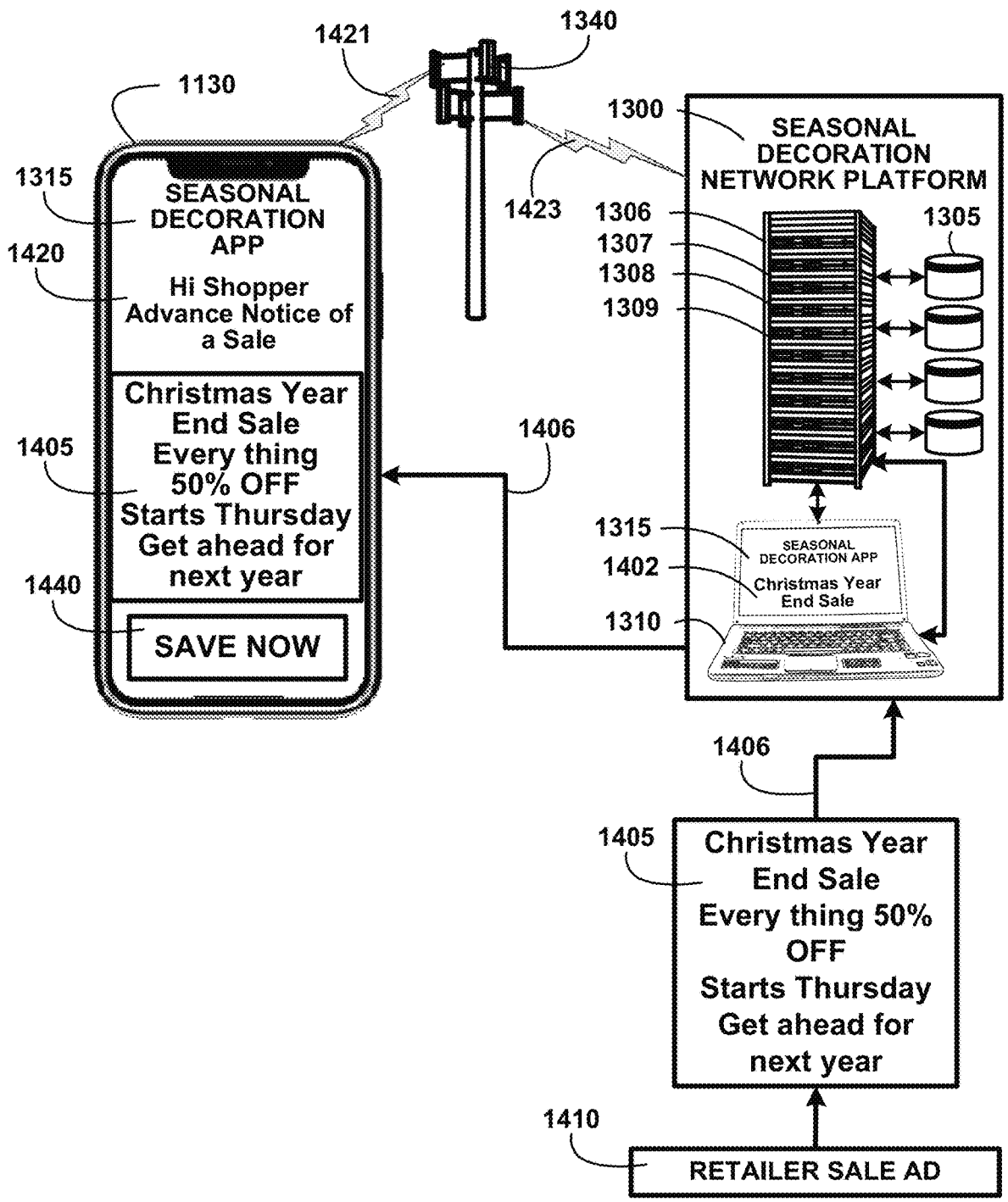
FIG. 14 shows for illustrative purposes only an example of seasonal decoration network platform of one embodiment.

Seasonal Decoration Network Platform:

FIG. 14 shows for illustrative purposes only an example of seasonal decoration network platform of one embodiment. FIG. 14 shows the seasonal decoration network platform 1300 coupled to a plurality of databases 1305, a plurality of digital processors 1306, at least one Wi-Fi communication device 1307, at least one cellular communication device 1308, at least one OCR device 1309, and network computer 1310 with the seasonal decoration app 1315 installed.

The shopper cell phone with a camera 1130 with the seasonal decoration app 1315 installed will automatically communicate via a cellular tower 1340 and alternatively with a WIFI connection to receive a retailer sale ad 1410 for example a Christmas year end sale everything 50% off starts Thursday get ahead for next year 1405 transmitted to the seasonal decoration network platform 1406 and displayed on the network computer 1310 Christmas year end sale 1402. The shopper is logged into the 1421 seasonal decoration network platform 1300 via a cellular tower 1340 wherein the seasonal decoration network platform automatically responses to the shopper cell phone via the seasonal decoration app 1423. The seasonal decoration network platform automatically transmits the retailer sale ad to the shopper cell phone 1406. The shopper receives messages for example Hi shopper advance notice of a sale 1420 and the Christmas year end sale everything 50% off starts Thursday get ahead for next year is displayed on the shopper cell phone 1405 and an additional message to save now 1440 of one embodiment.

Figure 15:
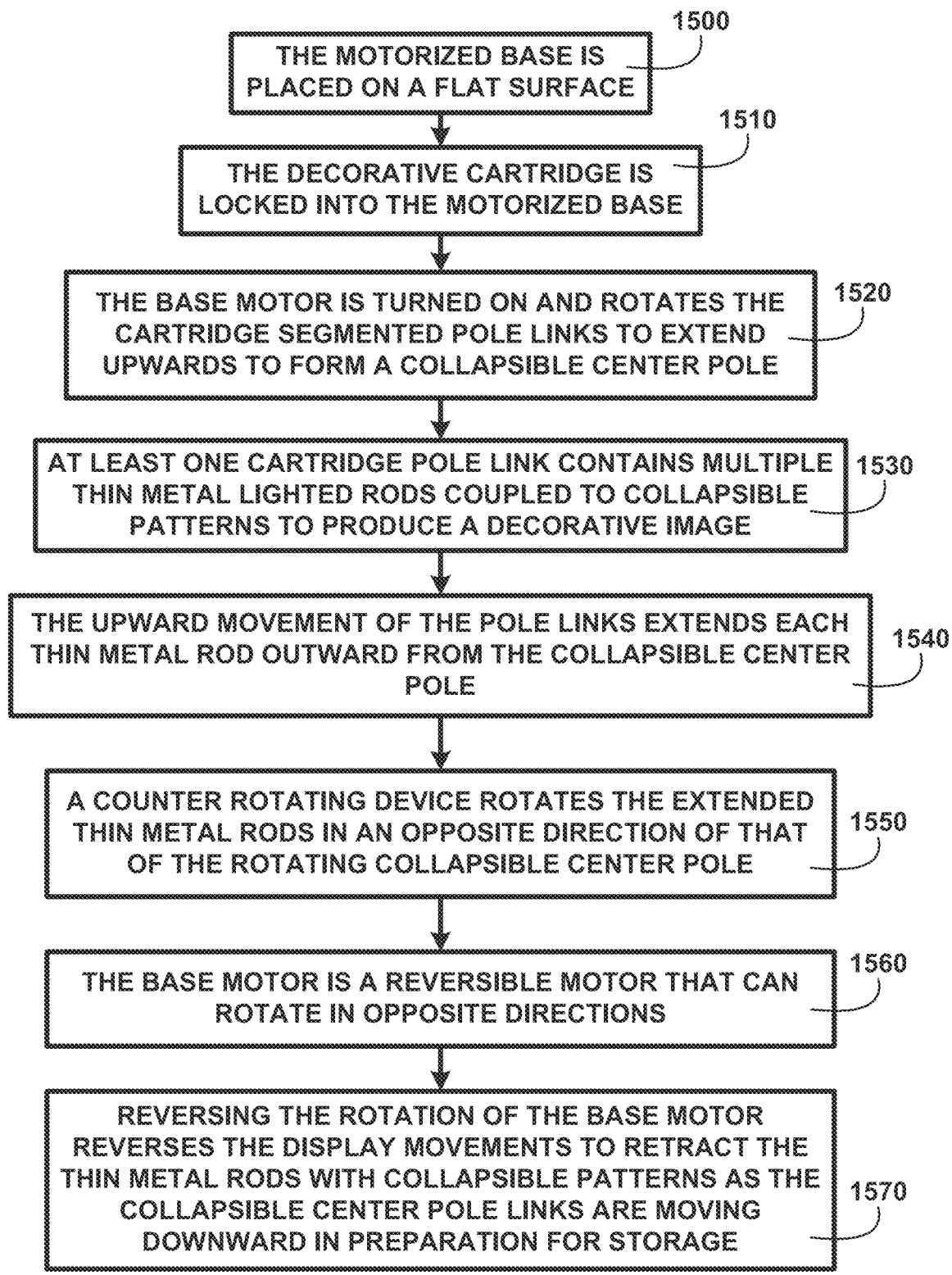
FIG. 15 shows a block diagram of an overview of producing a decorative image display of one embodiment.

Producing a Decorative Image Display:

FIG. 15 shows a block diagram of an overview of producing a decorative image display of one embodiment. FIG. 15 shows the process for displaying the interchangeable seasonal holiday decorative device 100 of FIG. 1. The motorized base is placed on a flat surface 1500. The decorative cartridge is locked into the motorized base 1510. The base motor is turned on and rotates the cartridge segmented pole links to extend upwards to form a collapsible center pole 1520. At least one cartridge pole link contains multiple thin metal lighted rods coupled to collapsible patterns to produce a decorative image 1530. The upward movement of the pole links extends each thin metal rod outward from the collapsible center pole 1540. A counter rotating device rotates the extended thin metal rods in an opposite direction of that of the rotating collapsible center pole 1550. The base motor is a reversible motor that can rotate in opposite directions 1560. Reversing the rotation of the base motor reverses the display movements to retract the thin metal rods with collapsible patterns as the collapsible center pole links are moving downward in preparation for storage 1570 of one embodiment.

Figure 16:
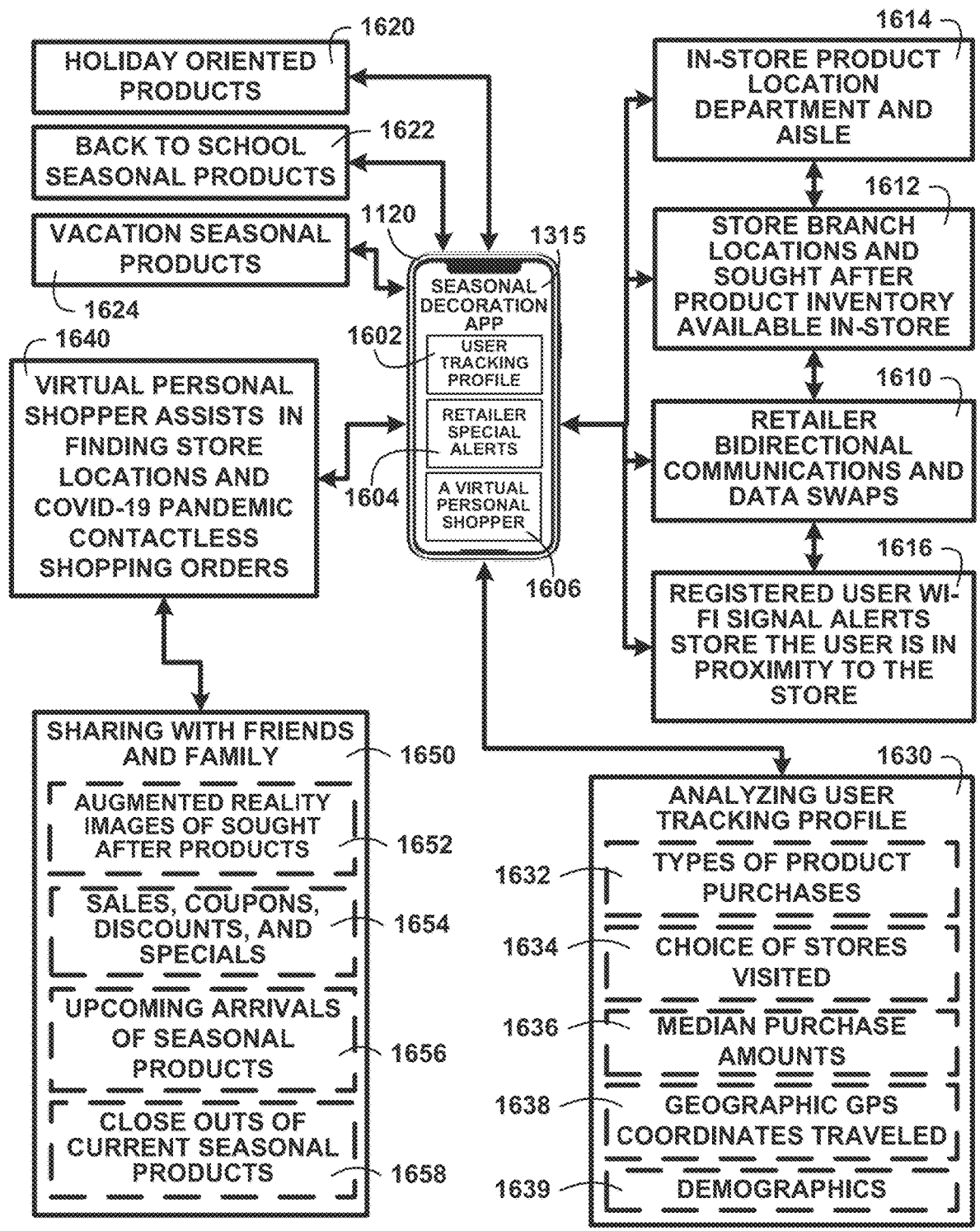
FIG. 16 shows a block diagram of an overview of analyzing user tracking profile of one embodiment.

Analyzing User Tracking Profile:

FIG. 16 shows a block diagram of an overview of analyzing user tracking profile of one embodiment. FIG. 16 shows the seasonal decoration app 1315 installed on the user cell phone 1120. The seasonal decoration app 1315 gathers information to create a user tracking profile 1602. The seasonal decoration app 1315 receives and displays retailer special alerts 1604 to keep the user current on products of interest. The seasonal decoration app 1315 provides a virtual personal shopper 1606 to assist the user in shopping.

The seasonal decoration app 1315 wirelessly is connected to retailer bidirectional communications and data swaps 1610. The retailer bidirectional communications and data swaps 1610 provides store branch locations and sought after product inventory available in-store 1612. In-store product location department and aisle 1614 saves the user time in searching up and down for a product of interest.

The seasonal decoration app 1315 broadcasts a registered user Wi-Fi signal alerts store the user is in proximity to the store 1616. Users are frequently in search of holiday oriented products 1620 including decorative products, back to school seasonal products 1622, and vacation seasonal products 1624. The seasonal decoration app 1315 performs analyzing user tracking profile 1930 with data including types of product purchases 1932, choice of stores visited 1934, median purchase amounts 1936, geographic GPS coordinates traveled 1938 and demographics 1938.

The virtual personal shopper assists in finding store locations and COVID-19 pandemic contactless shopping orders 1640. The seasonal decoration app 1315 provides a method for user sharing with friends and family 1650. Sharing with friends and family 1650 can include augmented reality images of sought after products 1652, sales, coupons, discounts, and specials 1654, upcoming arrivals of seasonal products 1656 and close outs of current seasonal products 1658. The seasonal decoration app 1315 can save the user time in their shopping, convenience in locating products of interest and saving money with sales, coupons, discounts, and specials 1654 of one embodiment.

Figure 17:
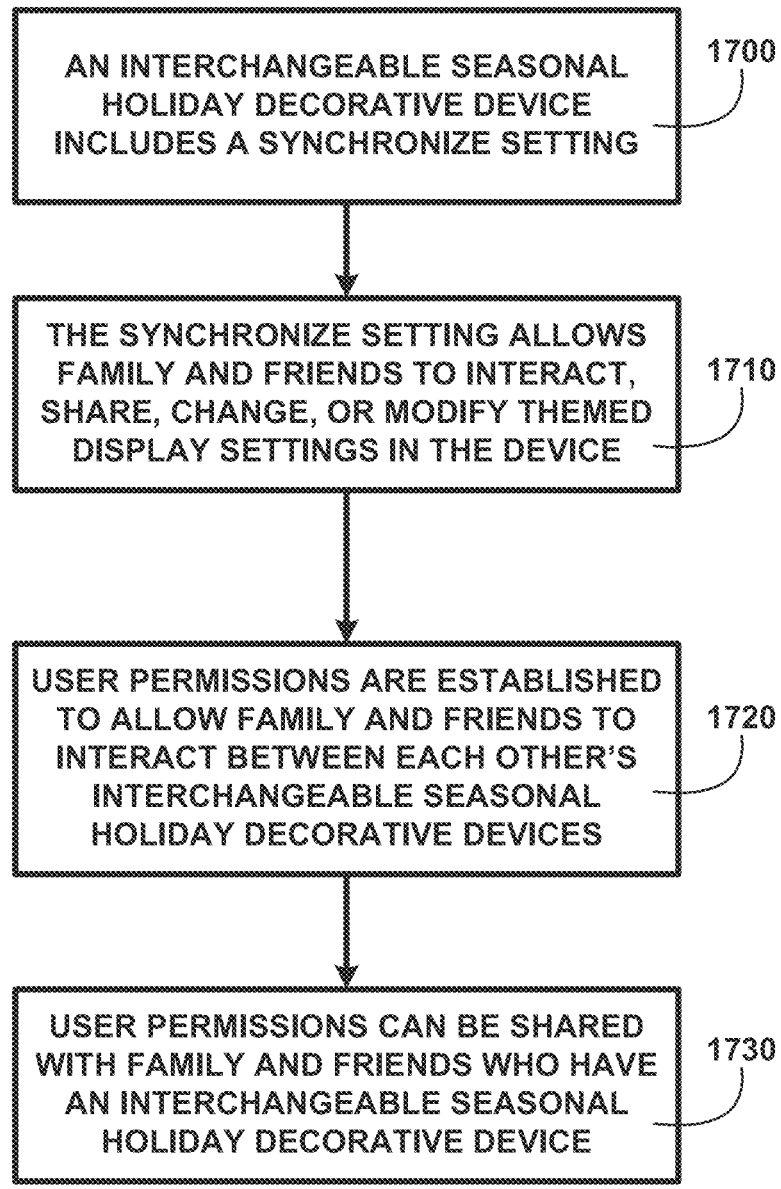
FIG. 17 shows a block diagram of an overview of a synchronize setting of one embodiment.

A Synchronize Setting:

FIG. 17 shows a block diagram of an overview of a synchronize setting of one embodiment. FIG. 17 shows an interchangeable seasonal holiday decorative device includes a synchronize setting 1700. The synchronize setting allows family and friends to interact, share, change, or modify themed display settings in the device 1710. User permissions are established to allow family and friends to interact between each other's interchangeable seasonal holiday decorative devices 1720. User permissions can be shared with family and friends who have an interchangeable seasonal holiday decorative device 1730. An interchangeable seasonal holiday decorative device includes a synchronize setting with user permissions to allow a user to interactively share settings with family and friends with an interchangeable seasonal holiday decorative device of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A method, comprising:
   displaying an interchangeable seasonal holiday decorative device;
   providing interchangeable seasonal holiday decorative devices in a number of seasonal decoration device themes;
   securing a motorized base of the interchangeable seasonal holiday decorative device placed on a flat surface;
   inserting a decorative cartridge into the motorized base;
   turning on the motorized base motor for rotating the decorative cartridge segmented pole links to extend upwards to form a collapsible center pole;
   wherein the motorized base motor rotation provides force to extend multiple metal lighted rods coupled to collapsible patterns contained in at least one cartridge pole link for producing decorative image;
   providing a counter rotating device coupled to at least one cartridge pole link for rotating the extended metal rods in an opposite direction of that of the rotating collapsible center pole;
   reversing the rotation of the motorized base motor for retracting the metal rods with collapsible patterns as the collapsible center pole links are moving downward in preparation for storage;
   providing an interchangeable seasonal holiday decorative device QR code display for allowing a shopper to download a seasonal decoration app for receiving interchangeable seasonal holiday decorative device sales and specials; and
   providing a near-field transmitter coupled to the interchangeable seasonal holiday decorative device QR code display for transmitting automatically for reporting of shopper seasonal decoration time spent, date, time of day, retailer store ID marketing data.

2. The method of claim 1, wherein the base motor is a reversible motor that can rotate in opposite directions.

3. The method of claim 1, further comprising providing light transmitting devices for coupling to the metal rods with collapsible patterns.

4. The method of claim 1, further comprising providing an interchangeable seasonal holiday decorative device remote control for allowing a user to remotely operate the interchangeable seasonal holiday decorative device from a distance.

5. The method of claim 1, wherein operating the interchangeable seasonal holiday decorative device remotely is performed using a interchangeable seasonal holiday decorative device remote control configured with functional features including controlling various speeds of the 360 degree turning radius, setting a turn on/off scheduling, a LCD display panel displaying user function options, a functions options selector, entering a selection with a selection button.

6. The method of claim 1, further comprising providing interchangeable seasonal holiday decorative devices in a number of seasonal decoration device themes including at least an Easter theme, Christmas theme, snowflake theme, fall leaf and oak leaf theme, pumpkin theme and spider web theme.

7. The method of claim 1, further comprising providing the motorized base configured to include at least one rechargeable battery, WIFI communication device, cellular communication device, motor, operational controls, a speaker and a digital memory device.

8. The method of claim 1, further comprising a QR code coupled to the interchangeable seasonal holiday decorative device QR code display for allowing a shopper to scan the QR code for downloading a seasonal decoration app.

9. The method of claim 1, further comprising providing a seasonal decoration network platform electronically coupled to a plurality of a plurality of databases, a plurality of digital processors, at least one WIFI communication device, at least one cellular communication device, at least one OCR device, and a network computer with the seasonal decoration app installed and configured to receive data from the near-field transmitter and process the data into valuable retailer marketing and user shopping data.

10. The method of claim 1, wherein transmitting near-field transmitter data is received for processing using a plurality of digital processors to analyze and convert the data into valuable marketing data.

11. An apparatus, comprising:
    an interchangeable seasonal holiday decorative device configured for displaying a dynamic rotating seasonal image theme pattern;
    a motorized base configured for extending, rotating and retracting the interchangeable seasonal holiday decorative device inserted into the motorized base;
    a counter rotating device coupled to at least one cartridge pole link of the interchangeable seasonal holiday decorative device configured for rotating extended metal rods with collapsible patterns in an opposite direction of that of a rotating collapsible center pole;
    an interchangeable seasonal holiday decorative device QR code display for allowing a shopper to download a seasonal decoration app for receiving interchangeable seasonal holiday decorative device sales and specials; and
    a near-field transmitter coupled to the interchangeable seasonal holiday decorative device QR code display for transmitting automatically shopper seasonal decoration time spent, date, time of day, retailer store ID marketing data.

12. The apparatus of claim 11, wherein the motorized base motor rotation provides force to extend multiple metal lighted rods coupled to collapsible patterns contained in at least one cartridge pole link for producing decorative image.

13. The apparatus of claim 11, wherein the rotation of the motorized base motor is configured to reversing the rotation for retracting the metal rods with collapsible patterns as the collapsible center pole links are moving downward in preparation for storage.

14. The apparatus of claim 11, further comprising a seasonal decoration network platform electronically coupled to a plurality of databases, a plurality of digital processors, at least one WIFI communication device, at least one cellular communication device, at least one OCR device, and a network computer with the seasonal decoration app installed and configured to receive data from the near-field transmitter and process the data into valuable retailer marketing and user shopping data.

15. The apparatus of claim 11, further comprising the interchangeable seasonal holiday decorative device is configured for displaying a number of seasonal decoration device themes including at least an Easter theme, Christmas theme, snowflake theme, fall leaf and oak leaf theme, pumpkin theme and spider web theme.

16. An apparatus, comprising:
    a dynamic rotating seasonal image theme pattern interchangeable seasonal holiday decorative device configured for displaying in user selected locations;
    an interchangeable seasonal holiday decorative device motorized base configured for extending, rotating and retracting the interchangeable seasonal holiday decorative device inserted into the motorized base;
a plurality of a cartridge pole link and a notch link extended upwards from the motorized base for forming a rotating collapsible center pole;
a plurality of metal rods with lighted collapsible seasonal patterns extending from at least one notch link configured to form a seasonal counter rotating seasonal pattern display;
a counter rotating device coupled to at least one notch link configured for rotating extended metal rods with lighted collapsible patterns in an opposite direction of that of a rotating collapsible center pole;
a seasonal decoration network platform for notifying shoppers of retailer sales and specials for the dynamic rotating seasonal image theme pattern interchangeable seasonal holiday decorative device; and
a near-field transmitter coupled to an interchangeable seasonal holiday decorative device QR code display for transmitting automatically shopper seasonal decoration time spent, date, time of day, retailer store ID marketing data to the seasonal decoration network platform.

17. The apparatus of claim 16, further comprising the seasonal decoration network platform automatically transmitting and installing a seasonal decoration app on a shopper cell phone that has scanned the QR code coupled to the interchangeable seasonal holiday decorative device QR code display.

18. The apparatus of claim 16, further comprising an interchangeable seasonal holiday decorative device includes a synchronize setting with user permissions to allow a user to interactively share settings with family and friends with an interchangeable seasonal holiday decorative device.

19. The apparatus of claim 16, further comprising the motorized base rotating the plurality of a cartridge pole link and a notch link provides the force to extend the plurality of metal rods with lighted collapsible seasonal patterns from the at least one notch link.

20. The apparatus of claim 16, further comprising the interchangeable seasonal holiday decorative device is configured for displaying a number of seasonal decoration device themes including at least an Easter theme, Christmas theme, snowflake theme, fall leaf and oak leaf theme, pumpkin theme and spider web theme.

* * * * *